(12) United States Patent
Jordil et al.

(10) Patent No.: US 7,347,000 B2
(45) Date of Patent: Mar. 25, 2008

(54) TOUCH PROBE

(75) Inventors: Pascal Jordil, Ecoteaux (CH); Claude Rouge, Baulmes (CH)

(73) Assignee: Tesa SA, Renes (CH)

( * ) Notice: Subject to any disclaimer, the term of this patent is extended or adjusted under 35 U.S.C. 154(b) by 0 days.

(21) Appl. No.: 11/157,298

(22) Filed: Jun. 22, 2005

(65) Prior Publication Data

US 2005/0278969 A1    Dec. 22, 2005

(30) Foreign Application Priority Data

Jun. 22, 2004    (EP)    ................................ 04102867

(51) Int. Cl.
*G01B 7/012*    (2006.01)
(52) U.S. Cl. .......................................... 33/561; 33/559
(58) Field of Classification Search ................. 33/556, 33/558, 559, 561
See application file for complete search history.

(56) References Cited

U.S. PATENT DOCUMENTS

| 4,360,973 | A | * | 11/1982 | McMurtry | ................... 33/561 |
| 4,859,817 | A | * | 8/1989 | Cassani | ................... 200/61.41 |
| 5,040,306 | A | * | 8/1991 | McMurtry et al. | ............ 33/556 |
| 5,299,361 | A | * | 4/1994 | Fiedler | ........................ 33/559 |
| 5,634,280 | A | * | 6/1997 | Hellier et al. | ................. 33/559 |
| 6,760,977 | B2 | * | 7/2004 | Jordil et al. | .................. 33/558 |
| 2003/0101609 | A1 | | 6/2003 | Jordil et al. | |

FOREIGN PATENT DOCUMENTS

| DE | 37 13 415 A | 11/1988 |
| DE | 43 41 192 C | 5/1995 |
| DE | 200 06 504 | 8/2000 |
| EP | 0 764 827 | 3/1997 |

\* cited by examiner

*Primary Examiner*—R. Alexander Smith
(74) *Attorney, Agent, or Firm*—Pearne & Gordon LLP

(57) ABSTRACT

Touch probe for a machine for measuring coordinates, including a contact feeler (12), relatively mobile relatively to a fixed organ (1) and held in a defined and repeatable resting position by a spring (21). The probe comprises an electric circuit to detect the displacements of the feeler (12). The resting position is defined by six contact points distributed around the axis of the feeler to obtain a uniform sensitivity to lateral forces.

14 Claims, 4 Drawing Sheets

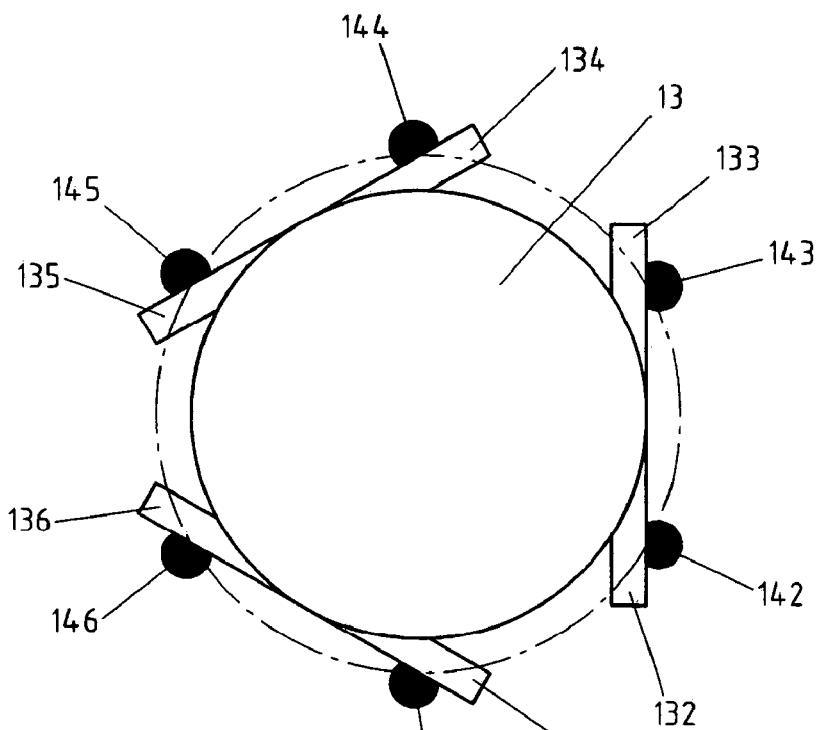
Fig. 6
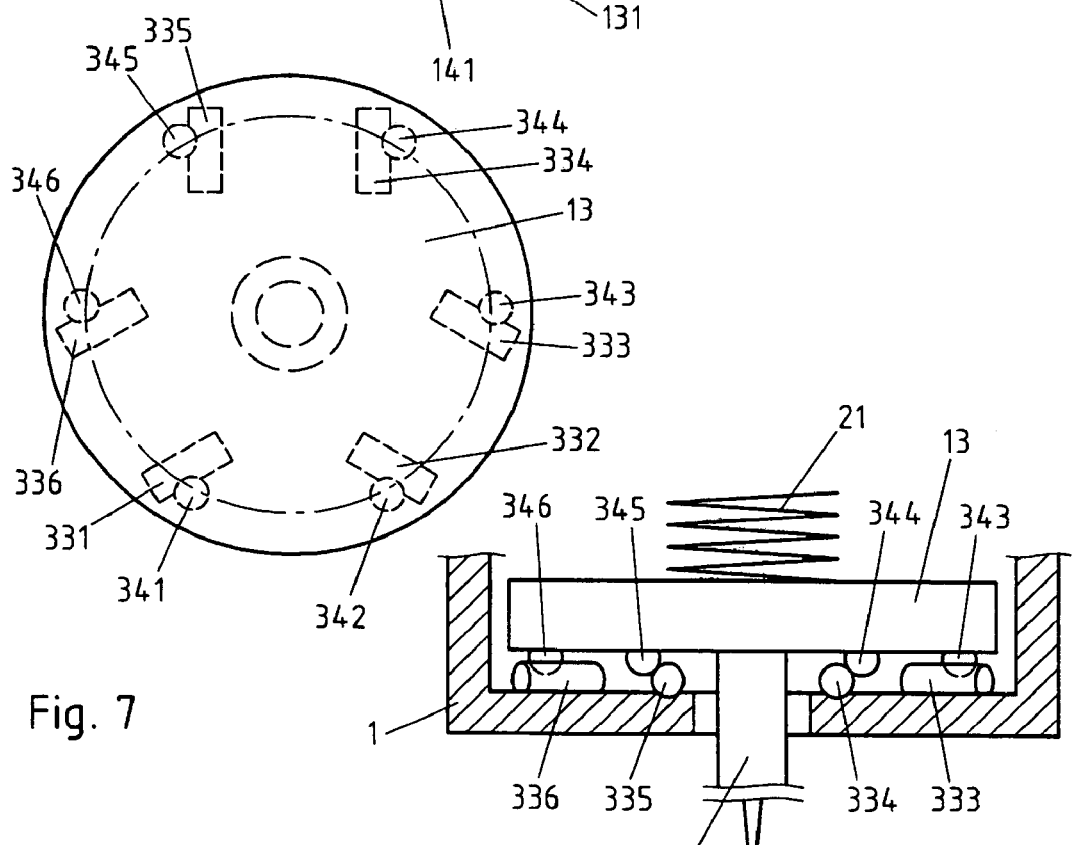
Fig. 7
Fig. 8

TOUCH PROBE

FIELD OF THE INVENTION

The present invention pertains to the field of probes for measuring coordinates, and notably to a touch probe based on the principle of the Boys connection capable of being used as fitting to a machine for measuring coordinates in three dimensions.

BACKGROUND OF THE INVENTION

Touch probes are electromechanical measuring elements used widely, but not uniquely, on production lines of mechanical pieces, for example for regulating production machines or for quality controls. They serve for accurately checking dimensions or for controlling the regularity of a surface or of a production batch.

Touch probes are usually fastened on the mobile arm of a measuring machine whose position is determined accurately by means of measuring systems that are for example capacitive, inductive, magnetoresistive or optical. The arm of the measuring machine is moved in space along a determined trajectory until the probe's feeler comes into contact with the piece or the surface to be measured. During contact, a deflective force is applied on the feeler, thus moving it out from its initial resting position. An electric circuit is thus either closed or opened and a signal is generally sent on the one hand to the user, for example in the form of a light signal, on the other hand to the software of the measuring machine which thus determines, on the basis of the data of the measuring system, the coordinates of the contact point within a given reference frame. The software then allows the distance between two measuring points to be computed and, in certain cases, to represent an object to be measured in two or three dimensions by means of a series of measuring points.

In another application, touch probes serve to control the regularity of a surface or of a production batch. A probe is fastened onto an immobile element and a surface or a series of pieces runs past the sensor so as to barely touch the probe. If the surface has irregularities or if the pieces are not of regular dimensions, the probe's feeler will be subjected to a force which will make it come out of its resting position, thus modifying the signal emitted by the probe's electric circuit.

The main elements of a touch probe are usually a fixed organ, a feeler and an electric circuit serving to detect the feeler's movements relatively to its resting position.

The fixed organ is fixed relatively to the fastening element, the fastening element being generally incorporated to the probe's case and allowing the probe to be fastened, for example on the mobile arm of a measuring machine.

The probe is the mechanical element designed to come into contact with the surface or the piece to be measured. The probe usually comprises a calibrated contact sphere of ruby or of hard stone fastened to the extremity of a straight or bent rod that is held by an elastic element in a resting position relatively to the fixed organ. This resting position is determined and reproducible. The probe has one or several degrees of freedom relatively to the fixed organ. During contact with the surface to be measured, a deflective force is exerted on the probe that comes out of its resting position according to one or several of its degrees of freedom relatively to the fixed organ. When the force is no longer applied on the probe, the latter returns into its resting position.

It will thus be easily understood that the accuracy and repeatability of the probe's positioning relatively to the fixed organ play an essential role in the measurement's accuracy.

Commonly, touch probes comprise an isostatic connection between the probe and the fixed organ. This connection comprises six independent contact points, so as to determine exactly the relative position of the probe relatively to the fixed organ. Generally, the six contact points are made by three pins of hard metal, oriented at 120° to one another, each pin resting between the spheres united with the probe's fixed organ. The spheres are electrically connected to form a circuit comprising six serial switches in order to signal the contact of the probe with the piece to be measured.

This arrangement however has the disadvantage that the probe's sensitivity to a transversal force is not constant but varies according to the orientation of the external force, and notably in the case of lateral forces, oriented along a plane orthogonal to the probe's axis.

The sensitivity of this type of probe to lateral forces is thus not uniform but has three lobes corresponding to the directions of the three pins. This variation of the sensitivity is detrimental to the repeatability of the touch and thus to the quality of the measuring.

Patent application EP0360853 attempts to remedy these problems by proposing a probe in which the electric circuit is replaced by constraint gauges directly sensitive to the applied force. This device has a symmetrical response. However, use of constraint gauges is more complex and more expensive to implement than mechanical touch probes.

One aim of the present invention is to propose a touch probe devoid of the inconveniences of the prior art.

Another aim of the present invention is to propose a simple and reliable touch probe that exhibits a constant sensitivity to lateral forces.

These aims are achieved by the probe being the object of the independent claim and notably by a probe including: a fixed organ; a feeler held by an elastic element in a resting position relatively to said fixed organ, said resting position being reproducible, said feeler being capable of moving from said resting position in response to a deflective force and capable of returning to said resting position when said force ceases to be applied; a plurality of mobile positioning elements united with said feeler; a plurality of fixed positioning elements united with said fixed organ and capable of engaging with said mobile positioning elements to define six contact points; characterized in that said six contact points are distributed around the axis of said feeler so as to obtain an essentially uniform sensitivity to deflective forces in an orthogonal plane to said feeler.

The present invention derives from the observation that the touch's sensitivity to lateral forces can be made uniformed by judiciously selecting the position of the contact points. In particular, it is possible to distribute the contact points in an arrangement having a hexagonal symmetry by 60° rotations. On the other hand, the distribution of the contact points in known touch probes is symmetrical by 120° rotations. In such an arrangement, the probe's sensitivity to lateral forces is practically constant.

The present invention will be better understood by reading the description given by way of example and illustrated by the attached figures.

DESCRIPTION OF THE DRAWINGS

FIGS. 5 and 6 represent a further variant of the repositioning system of a probe according to the invention;

FIGS. 7 and 8 represent a cross-sectional view of a further embodiment of the invention.

DETAILED DESCRIPTION OF THE INVENTION

Figure 1:
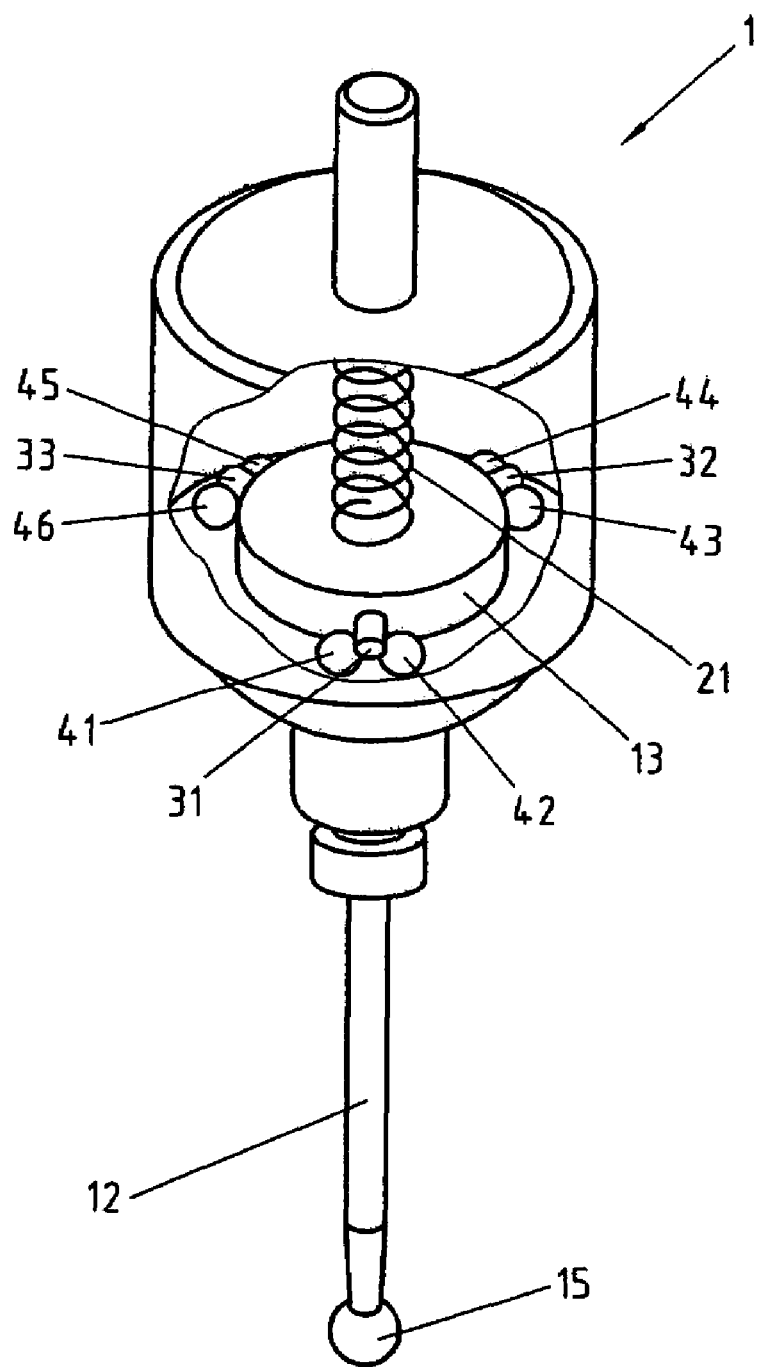
FIG. 1 shows a touch probe of known type.
Figure 2:
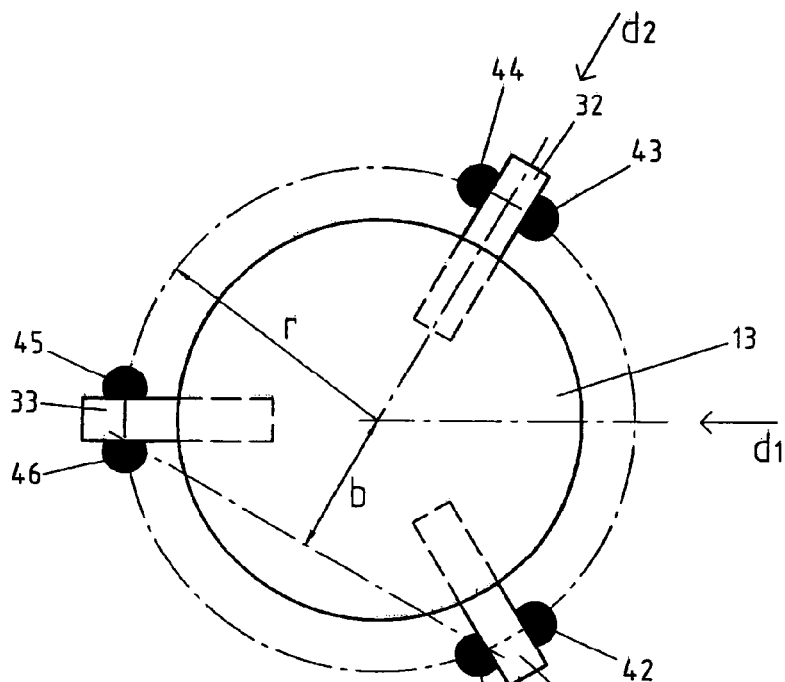
FIG. 2 represents a simplified diagram of the re-positioning system of the probe of FIG. 1.

FIGS. 1 and 2 represent a touch probe of known type. A probe feeler 12 comprises at one extremity a sphere 15 whose diameter is determined exactly and designed to contact the piece to be measured. The touch rod is united with the plate 13, held in position by the pins 31, 32, 33 resting on the spheres 41-46 under the action of the spring 21.

The probe's resting position is determined in an accurate and reproducible manner by the six contact points between the pins 31-33 and the spheres 41-46, according to the principle of the Boys connection. When the sphere 15 is moved from its resting position, at least one of the six contact points is interrupted and the variation of the following electric circuit's resistance allows the contact to be detected.

In order for a contact to be detected, the vertical component of the force exerted by the plate 13 on the spring 21 must exceed the latter's tension. It will be easily understood that, in the case of a lateral force, the detection threshold is not constant but depends on the force's orientation. The force required for detection will be greater for a contact in the direction d2 of FIG. 2 than for the direction d1.

In the case of a force along the direction d2, the deflection axis is situated at a distance r from the center and, in the case of a deflective force oriented along the direction d1, the deflection takes place at a distance b.

The theoretical relation, without taking into account friction forces, between the minimal force and the maximal force required to trigger the feeler is thus given by $r/b=1/\cos 60°=2$.

The sensitivity of this type of probe to lateral forces is thus not uniform but presents three lobes corresponding to the directions of the three pins.

Figure 3:
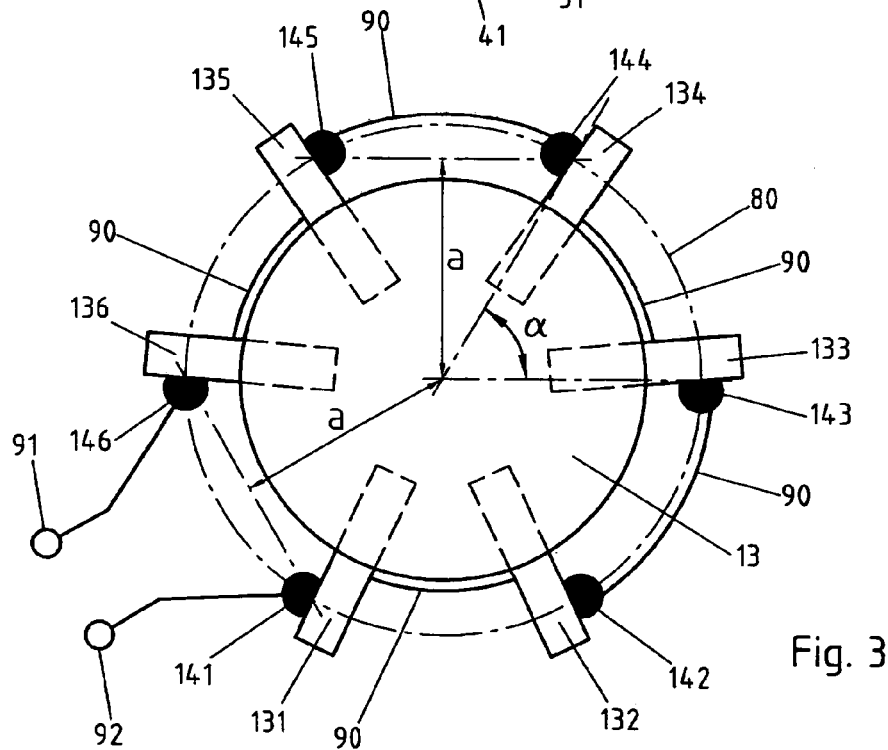
FIG. 3 represents a simplified diagram of the repositioning system of a probe according to the invention.

FIG. 3 represents the touch of a probe according to a first embodiment of the invention. In the device of FIG. 3, the feeler 12 ends with a plate 13 on the periphery of which are placed six radial pins 131-136. In resting position, each pin touches one sphere 141-146 united with the probe's fixed organ.

It can be observed that, in the touch of FIG. 3, the six contact points that define the resting position of the feeler 12 are distributed around the axis of the feeler 12 so as to cancel out the sensitivity variation relatively to the direction of the lateral deflective force. This more symmetrical arrangement allows a more uniform response relatively to the touch represented in FIGS. 1 and 2, in which the contact points are regrouped pair-wise at the vertex of an equilateral triangle. The sensitivity of the inventive probe to lateral forces is essentially uniform and does not depend or only slightly depends on the direction of the applied force.

Conductor elements 90 connect the pins and the spheres to make an electric circuit normally closed that opens as soon as any one of the pins is separated from the corresponding sphere. It would for example be possible to connect the pairs of pins 131-132, 133-134 and 135-156 as well as the spheres 142-143 and 144-145 as represented diagrammatically in FIG. 3. The contact with the piece to be measured is detected by the variation of the resistance at the terminals 91, 92 connected to the spheres 141 and 146. Other arrangements are however possible.

The conductor elements 90 can be made by soldered or glued electric wires or by depositing a layer of conducting paint or glue or by any other known method. The isolation of the spheres and of the pins from their relative supports can be obtained for example by eloxiding.

Advantageously, the contact points are placed along a circumference 80 centered around the axis of the feeler 12. The angular distance α between each pair of successive contact points is essentially equal to 60°, so that the contact points are located on the vertexes of a hexagon centered around the feeler's axis. It is however possible to slightly alter this arrangement without the symmetry of the probe's response being impaired. It could thus be conceivable to place the contact points along a different curve or to slightly modify the angular distances between the contact points.

In the arrangement of FIG. 3, the deflection distance of the feeler 12 is always equal to a for all lateral forces. Naturally, friction forces prevent this ideal ratio to be achieved exactly.

The angular distance between each pair of adjacent contact points is preferably equal exactly to 60° or it is in any case close to this value, for example between 40° and 80°, preferably between 50° and 70°.

The spheres 141-146 are arranged relatively to the pins 131-136 so that the three spheres 142, 144 and 146 precede the pins 132, 134 and 136 respectively when the circumference 80 is traveled clockwise, and the spheres 141, 143 and 145 follow the pins 131, 133 and 135 in the same range. This alternating arrangement allows a stable and accurate resting position to be defined. Other arrangements in which part of the spheres 141-146 precede the pins 131-136 and another part of the spheres 141-146 follow the pins 131-136 are however possible within the framework of the present invention.

Optionally, the pins and the spheres can be replaced by other positioning elements capable of defining six punctual contacts between the fixed organ 1 and the plate 13 of the feeler 12. For example, the pins could be replaced by inclined planes.

The pins 131-136 of the probe of FIG. 3 are arranged essentially radially relatively to the axis of the feeler 12. In a further mode of the invention, represented in FIG. 4, the pins 131-136 are arranged in parallel pairs along three directions essentially separated angularly by 120° between them.

Figure 5:
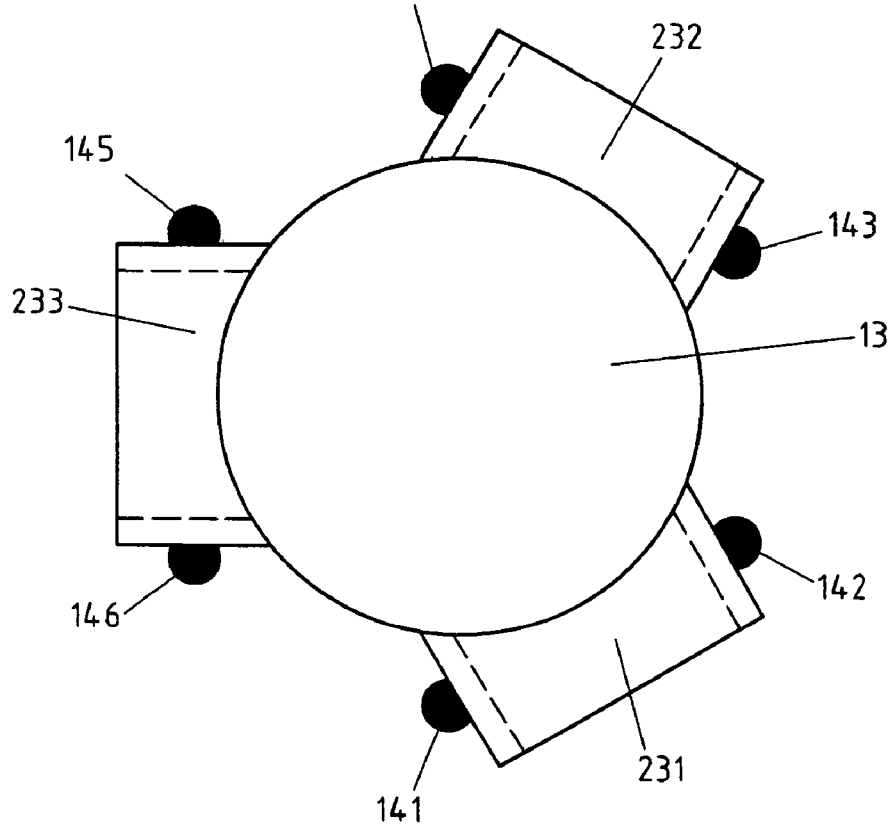

In another embodiment of the invention, represented in FIG. 5, the plate 13 bears on its periphery three blocks 231, 232, 233 arranged essentially at 120° and each block touches two of the spheres 141-146 of the fixed organ. The six contact points between the blocks 231-233 and the spheres 141-146 are distributed around the axis of the feeler 12 so as to obtain a uniform sensitivity to lateral forces. Advantageously, the contact points are placed at the vertexes of a hexagon centered relatively to the axis of the feeler 12.

In the embodiment of the invention represented in FIG. 6, the pins 131-136 are arranged in three pairs of pins converging towards the outside of the plate 13, in an essentially symmetrical arrangement by 120° rotation. The six contact points between the pins 131-136 and the spheres 141-146 are distributed around the axis of the feeler 12 so as to obtain a uniform sensitivity to the lateral forces. They are placed preferably at the vertexes of a hexagon centered relatively to the axis of the feeler 12.

Figure 4:
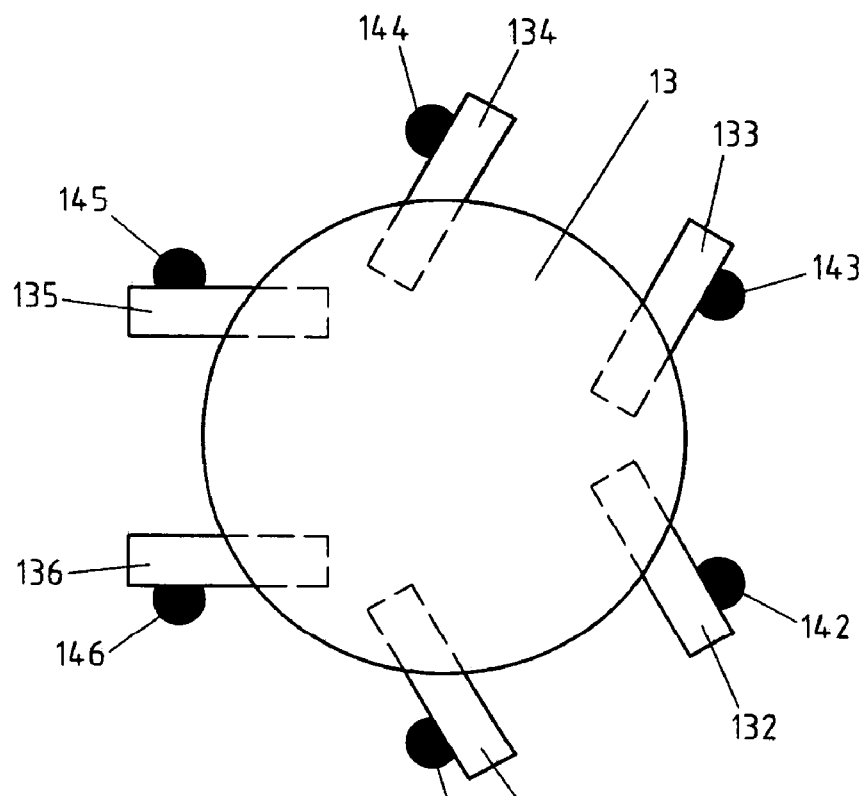
FIG. 4 shows a variant embodiment of the repositioning system of a probe according to the invention.

The variant embodiments represented in FIGS. 3, 4, 6 are distinguished by a rotation of the pins 131-136 around the respective contact points with balls 141-146. These examples are not to be interpreted as a limitation of the invention to these specific orientation angles of the pins relatively to the balls. The present invention also comprises many other arrangements, characterized by any angle between the pins 131-136 and the balls 141-146.

It is also possible, within the framework of the present invention, to invert the position of the pins and of the spheres and to arrange the spheres on the plate 13 and the pins on the fixed organ 1, as represented in FIG. 8.

The invention claimed is:

1. Probe including:
   a fixed organ (1);
   a feeler (12) held by an elastic element (21) in a resting position relatively to said fixed organ, said resting position being reproducible, said feeler (12) being capable of moving from said resting position in response to a deflective force and capable of returning to said resting position when said force ceases to be applied;
   a plurality of mobile positioning elements (131, 132, 133, 134, 135, 136, 231, 232, 233) united with said feeler (12);
   a plurality of fixed positioning elements (141, 142, 143, 144, 145, 146) united with said fixed organ and capable of engaging with said mobile positioning elements to define six contact points;
   characterized in that said six contact points are distributed around the axis of said feeler (12) so as to obtain an essentially uniform sensitivity to deflective forces in an orthogonal plane to said feeler (12),
   said mobile positioning elements comprising pins,
   said fixed positioning elements comprising spheres, and
   wherein said pins are arranged in three pairs, in an arrangement essentially symmetrical by 120° rotations,
   each pair comprising two said pins, each of which touches one of said spheres.

2. Probe according to claim 1, wherein the pins of each pair each touch one of said spheres according to the same angle.

3. Probe including:
   a fixed organ (1);
   a feeler (12) held by an elastic element (21) in a resting position relatively to said fixed organ, said resting position being reproducible, said feeler (12) being capable of moving from said resting position in response to a deflective force and capable of returning to said resting position when said force ceases to be applied;
   a plurality of mobile positioning elements (131, 132, 133, 134, 135, 136, 231, 232, 233) united with said feeler (12);
   a plurality of fixed positioning elements (141, 142, 143, 144, 145, 146) united with said fixed organ and capable of engaging with said mobile positioning elements to define six contact points;
   characterized in that said six contact points are distributed around the axis of said feeler (12) so as to obtain an essentially uniform sensitivity to deflective forces in an orthogonal plane to said feeler (12),
   wherein said mobile positioning elements comprise six pins (131, 132, 133, 134, 135, 136) arranged in parallel pairs, along these directions, essentially separated angularly by 120° from each other and wherein said fixed positioning elements comprise six spheres (141, 142, 143, 144, 145, 146) united with said fixed organ (1), wherein, in resting position, each of said pins touches one of said spheres.

4. Probe including:
   a fixed organ (1);
   a feeler (12) held by an elastic element (21) in a resting position relatively to said fixed organ, said resting position being reproducible, said feeler (12) being capable of moving from said resting position in response to a deflective force and capable of returning to said resting position when said force ceases to be applied;
   a plurality of mobile positioning elements (131, 132, 133, 134, 135, 136, 231, 232, 233) united with said feeler (12);
   a plurality of fixed positioning elements (141, 142, 143, 144, 145, 146) united with said fixed organ and capable of engaging with said mobile positioning elements to define six contact points;
   characterized in that said six contact points are distributed around the axis of said feeler (12) so as to obtain an essentially uniform sensitivity to deflective forces in an orthogonal plane to said feeler (12),
   wherein said mobile positioning elements comprise six pins (131, 132, 133, 134, 135, 136) arranged in pairs converging outwards, in an arrangement essentially symmetrical by 120° rotations, and wherein said fixed positioning elements comprise six spheres (141, 142, 143, 144, 145, 146) united with said fixed organ (1), wherein, in resting position, each unit of said pins touches one of said spheres.

5. Probe including:
   a fixed organ (1);
   a feeler (12) held by an elastic element (21) in a resting position relatively to said fixed organ, said resting position being reproducible, said feeler (12) being capable of moving from said resting position in response to a deflective force and capable of returning to said resting position when said force ceases to be applied;
   a plurality of mobile positioning elements (131, 132, 133, 134, 135, 136, 231, 232, 233) united with said feeler (12);
   a plurality of fixed positioning elements (141, 142, 143, 144, 145, 146) united with said fixed organ and capable of engaging with said mobile positioning elements to define exactly six contact points;
   characterized in that said six contact points are distributed around the axis of said feeler (12) 50 as to obtain an essentially uniform sensitivity to deflective forces in an orthogonal plane to said feeler (12),
   said contact points following each other around a circumference or a closed curve centered around the axis of said feeler (12),
   following said circumference or said closed curve, part of said fixed positioning elements (141, 142, 143, 144, 145, 156) precede said mobile positioning elements (131,132, 133, 134, 135, 136, 231, 232, 233) and part of said fixed positioning elements (141, 142, 143, 144, 145, 146) follow said mobile positioning elements,
   following said circumference or said closed curve, said fixed positioning elements precede and follow said mobile positioning elements according to an alternating arrangement.

6. Probe according to claim 5, wherein an angular distance, taking as center the axis of the feeler (12), between two successive contact points is essentially identical for each pair of successive contact points.

7. Probe according to claim 6, wherein said angular distance is essentially equal to 60°.

8. Probe according to claim 6, wherein said angular distance is comprised between 50° and 70°.

9. Probe according to claim 6, wherein said angular distance is comprised between 40° and 80°.

10. Probe according to claim 5, including a plurality of electric conductors (90) connecting the pairs of said fixed and mobile positioning elements to form an electric circuit whose resistance is modified when said feeler (12) is moved from its resting position.

11. Probe including:
   a fixed organ (1);
   a feeler (12) held by an elastic element (21) in a resting position relatively to said fixed organ, said resting position being reproducible, said feeler (12) being capable of moving from said resting position in response to a deflective force and capable of returning to said resting position when said force ceases to be applied;
   a plurality of mobile positioning elements (131, 132, 133, 134, 135, 136, 231, 232, 233) united with said feeler (12);
   a plurality of fixed positioning elements (141, 142, 143, 144, 145, 146) united with said fixed organ and capable of engaging with said mobile positioning elements to define exactly six contact points;
   characterized in that said six contact points are distributed around the axis of said feeler (12) so as to obtain an essentially uniform sensitivity to deflective forces in an orthogonal plane to said feeler (12),
   said mobile positioning elements comprise six pins (131, 132, 133, 134, 135, 136) and wherein said fixed positioning elements comprise six spheres (141, 142, 143, 144, 145, 146) united with said fixed organ (1), wherein, in resting position, each of said pins touches one of said spheres.

12. Probe according to claim 11, wherein said pins are arranged radially relatively to the axis of said feeler (12).

13. Probe including:
   a fixed organ (1);
   a feeler (12) held by an elastic element (21) in a resting position relatively to said fixed organ, said resting position being reproducible, said feeler (12) being capable of moving from said resting position in response to a deflective force and capable of returning to said resting position when said force ceases to be applied;
   a plurality of mobile positioning elements (131, 132, 133, 134, 135, 136, 231, 232, 233) united with said feeler (12);
   a plurality of fixed positioning elements (141, 142, 143, 144, 145, 146) united with said fixed organ and capable of engaging with said mobile positioning elements to define exactly six contact points;
   characterized in that said six contact points are distributed around the axis of said feeler (12) so as to obtain an essentially uniform sensitivity to deflective forces in an orthogonal plane to said feeler (12),
   said mobile positioning elements include six spheres (341, 342, 343, 344, 345, 346) and wherein said fixed positioning elements include six pins (331, 332, 333, 334, 335, 336) united with said fixed organ (1), in which, in resting position, each of said pins touches one of said spheres.

14. Probe including:
   a fixed organ (1);
   a feeler (12) held by an elastic element (21) in a resting position relatively to said fixed organ, said resting position being reproducible, said feeler (12) being capable of moving from said resting position in response to a deflective force and capable of returning to said resting position when said force ceases to be applied;
   a plurality of mobile positioning elements (131, 132, 133, 134, 135, 136, 231, 232, 233) united with said feeler (12);
   a plurality of fixed positioning elements (141, 142, 143, 144, 145, 146) united with said fixed organ and capable of engaging with said mobile positioning elements to define exactly six contact points;
   characterized in that said six contact points are distributed around the axis of said feeler (12) 50 as to obtain an essentially uniform sensitivity to deflective forces in an orthogonal plane to said feeler (12)
   said mobile positioning elements include three blocks (231, 232, 233) and wherein said fixed positioning elements include six spheres (141, 142, 143, 144, 145, 146) united with said fixed organ (1), wherein, in resting position, each of said blocks touches two said spheres.

* * * * *